(12) United States Patent
Kunstmann

(10) Patent No.: US 8,306,820 B2
(45) Date of Patent: Nov. 6, 2012

(54) METHOD FOR SPEECH RECOGNITION USING PARTITIONED VOCABULARY

(75) Inventor: Niels Kunstmann, Haar (DE)

(73) Assignee: Siemens Aktiengesellschaft, Munich (DE)

( * ) Notice: Subject to any disclaimer, the term of this patent is extended or adjusted under 35 U.S.C. 154(b) by 908 days.

(21) Appl. No.: 11/667,825

(22) PCT Filed: Oct. 4, 2005

(86) PCT No.: PCT/EP2005/054979
§ 371 (c)(1),
(2), (4) Date: May 16, 2007

(87) PCT Pub. No.: WO2006/053800
PCT Pub. Date: May 26, 2006

(65) Prior Publication Data
US 2008/0126090 A1    May 29, 2008

(30) Foreign Application Priority Data
Nov. 16, 2004  (DE) .......................... 10 2004 055 230

(51) Int. Cl.
*G10L 15/06* (2006.01)

(52) U.S. Cl. ..................................... 704/245; 704/251

(58) Field of Classification Search .................. 704/245, 704/251
See application file for complete search history.

(56) References Cited

U.S. PATENT DOCUMENTS

| | | | |
|---|---|---|---|
| 4,958,225 A * | 9/1990 | Bi et al. .................... | 375/240.22 |
| 4,975,959 A * | 12/1990 | Benbassat ...................... | 704/240 |
| 5,136,654 A | 8/1992 | Ganong, III et al. | |
| 5,526,463 A | 6/1996 | Gillick et al. | |
| 5,619,717 A * | 4/1997 | Staats ............................. | 712/36 |
| 5,640,488 A | 6/1997 | Junqua et al. | |
| 5,710,916 A * | 1/1998 | Barbara et al. ........................ | 1/1 |
| 5,860,063 A * | 1/1999 | Gorin et al. .................... | 704/257 |
| 7,026,962 B1 * | 4/2006 | Emami et al. .................... | 341/51 |
| 2003/0128269 A1 | 7/2003 | Squires et al. | |
| 2004/0098259 A1 | 5/2004 | Niedermair | |

FOREIGN PATENT DOCUMENTS

| | | |
|---|---|---|
| DE | 196 24 988 A1 | 1/1998 |
| EP | 0 755 046 A2 | 1/1997 |
| WO | 01/69591 A1 | 9/2001 |
| WO | 03/060877 A1 | 7/2003 |

OTHER PUBLICATIONS

Jean-Cluade Junqua, "SmarTspelL™: A Multipass Recognition System for Name Retrieval Over the Telephone"; IEEE Transaction on Speech and Audio Processing; vol. 5, No. 2, Mar. 1997; pp. 173-182.
International Search Report for Application No. PCT/EP2005/054979; mailed Dec. 29, 2005.

* cited by examiner

*Primary Examiner* — Talivaldis Ivars Smits
*Assistant Examiner* — Shaun Roberts
(74) *Attorney, Agent, or Firm* — Staas & Halsey LLP

(57) ABSTRACT

A is recognized using a predefinable vocabulary that is partitioned in sections of phonetically similar words. In a recognition process, first oral input is associated with one of the sections, then the oral input is determined from the vocabulary of the associated section.

6 Claims, 1 Drawing Sheet

DVD layout

METHOD FOR SPEECH RECOGNITION USING PARTITIONED VOCABULARY

CROSS REFERENCE TO RELATED APPLICATIONS

This application is based on and hereby claims priority to German Application No. 10 2004 055 230.4 filed on Nov. 16, 2004, the contents of which are hereby incorporated by reference.

BACKGROUND

Described below is a method for speech recognition from a predefinable vocabulary.

Speech recognition systems which can recognize individual words or word strings from a predefinable vocabulary are customarily used for operating telephones or non-safety-related components of the equipment of a motor vehicle by spoken commands. Further known examples relate to the operation of surgical microscopes by the operating physician and to the operation of personal computers.

In the operation of a car navigation system, for example, a desired destination location can be communicated by speech input. Two methods for doing this are known, and these are set out briefly below.

According to a first method, the over 70,000 possible German destination locations are grouped by region. This gives rise to a total of approx. 1,000 regions which are respectively characterized by a large central location. Since the assignment of small to large locations is not unambiguous and is also difficult for a user to place, individual locations are assigned to a plurality of regions. The location "Holzkirchen" lies, for example, both in the "Munich" region and in the "Bad Tölz" region. The inputting of a destination location is effected in a user dialog in two stages, the user first specifying a major town close to the desired destination location. After the destination region has been recognized, optionally after selection from a menu, the user is prompted to name the precise destination location within the destination region. From the recognizer hypotheses, the user can then confirm the desired input by voice or on a keyboard. The navigation data associated with a region is stored on a DVD in a coherent block, as a result of which the search procedure for data on a DVD can be speeded up considerably.

In a second method, a user communicates a destination location to the navigation system by spelling out the initial letters. With the aid of the recognized sequence of letters, the navigation system determines from the set of all locations the particular locations whose initial letters are similar to the recognized letter sequence. In a menu, the locations, sorted according to similarity, are presented to the user for further selection. The user can in turn then specify by voice input or via a keyboard the desired destination location.

A disadvantage of the first method is that users have to perform at least twice the inputting of their destination location. Also, the method is connected with further setbacks in terms of convenience since the assignment of small to large locations is not unambiguous and, moreover, requires prior geographical knowledge by the user. In the case of the second method, for each recognition procedure a search has to be performed within the complete list of all possible locations in order thereafter to compile an appropriate menu. The loading times and processing times before the menu is displayed are very time-intensive, which is why the method finds little acceptance among users.

SUMMARY

An aspect is to perform speech recognition from a predefined vocabulary, enabling convenient and fast application by a user.

In a method for recognizing a spoken input from a predefinable vocabulary, the predefinable vocabulary is subdivided into a number of sections of phonetically similar words. In a first recognition step, the spoken input is assigned to one of the sections. In a second recognition step, the spoken input is determined from the vocabulary of the assigned section. This has the advantage that only one input is needed by users in order to determine their spoken input. In addition, a search in the complete vocabulary is no longer required and is thus less time-intensive, as the search remains restricted to the assigned section.

According to a development, a word from the predefinable vocabulary is assigned to at least one section containing phonetically similar words. As a result, the recognition reliability of the system is advantageously improved, as a word can be found in different sections.

According to one variant, the predefinable vocabulary, structured in accordance with the sections of phonetically similar words, is stored in blocks on a storage medium, which may be fashioned, for example, as a DVD. This has the advantageous effect that read access to the storage medium (DVD) can be executed faster.

According to a further advantageous embodiment, the sections of phonetically similar words are respectively characterized by a representative entry. In a first recognition step, the spoken input is then assigned to the section whose representative entry is most similar to the spoken input. Swift assignment of the spoken input to one of the sections is thereby ensured.

The spoken input can be at least one spoken word or it can be individual spoken letters. According to an advantageous development, to subdivide the predefinable vocabulary into a number of sections of phonetically similar words, first, distance measures are determined for a phonetic similarity of two words. Next, the predefinable vocabulary is then subdivided by a vector quantization algorithm with the aid of the distance measures into a number of sections of phonetically similar words.

Using a vector quantization algorithm, a number of high-dimensional data vectors are assigned to some discrete representatives which are called codebook vectors. An example of a vector quantization algorithm is k-means clustering, in which in each case a data vector is assigned to one of k codebook vectors, subject to the proviso that the sum of the quadratic distances of the data vector to the assigned codebook vector is minimal.

One possibility for determining the distance measure for a phonetic similarity between two words is to first determine a ranking of recognized words with an associated ranking value in relation to one test utterance in each case. Then, the distance measure between two words is then determined by averaging the differences of the ranking values of the two words for the respective test utterances. This is just one possible method for determining a distance measure.

According to a further embodiment, distance measures for a phonetic similarity of two words can be determined by determining distance values for a similarity of two letters and adding the distance values of the individual letters for the distance measure of two letter sequences. For a predetermined length of a letter sequence, a vector quantization algorithm can then with the aid of the distance measures and/or overall distance measures subdivide the predefinable vocabulary into a number of sections of phonetically similar words.

According to a further advantageous development, a plurality of subdivisions of the predefinable vocabulary can be performed here, in each case for a different length of letter sequences. This achieves the advantage that, for a different number of spoken letters, a subdivision of the vocabulary that is adapted thereto is available in each case and the search process is speeded up as a result.

A further possibility for determining a distance measure for the similarity of two words is, for example, to use a Levenshtein distance as the distance measure.

The Levenshtein distance is a measure of the difference between two character strings as the minimum number of atomic changes that are necessary in order to transform the first character string into the second character string. Atomic changes are, for example, the insertion, the deletion and the substitution of an individual letter. Customarily, costs are assigned to the atomic changes and, by adding the individual costs, a measure of the distance or the similarity of two character strings is thus obtained.

In the execution of a computer program implementing the method, a predefinable vocabulary is subdivided by the program flow control device into a number of sections of phonetically similar words. In a recognition process, first a spoken input is assigned to one of the sections, then the spoken input is determined from the vocabulary of the assigned section.

BRIEF DESCRIPTION OF THE DRAWINGS

These and other objects and advantages will become more apparent and more readily appreciated from the following description of an exemplary embodiment, taken in conjunction with the accompanying drawings, in which.

DETAILED DESCRIPTION OF THE PREFERRED EMBODIMENT

Figure 1:
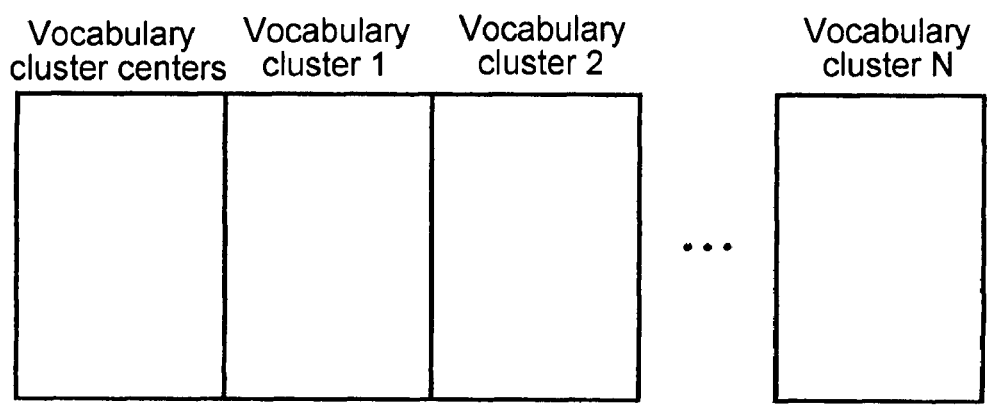
FIG. 1 is a schematic representation of a vocabulary subdivided into sections.

Reference will now be made in detail to the preferred embodiments, examples of which are illustrated in the accompanying drawings, wherein like reference numerals refer to like elements throughout.

In the exemplary embodiment, an implementation of the method is described in a car navigation system in which a desired destination location can be specified by a spoken input. The navigation data is located in this example on a DVD.

FIG. 1 shows a possible storage structure on the navigation-data DVD. Phonetically similar navigation data such as, for example, place names or street names, grouped in sections characterized by a cluster center, are filed on the DVD. If a spoken input has then been assigned to a cluster center, a place name can be found very quickly within the delimited storage area of the assigned section, without the entire DVD having to be searched through for this purpose.

Figure 2:
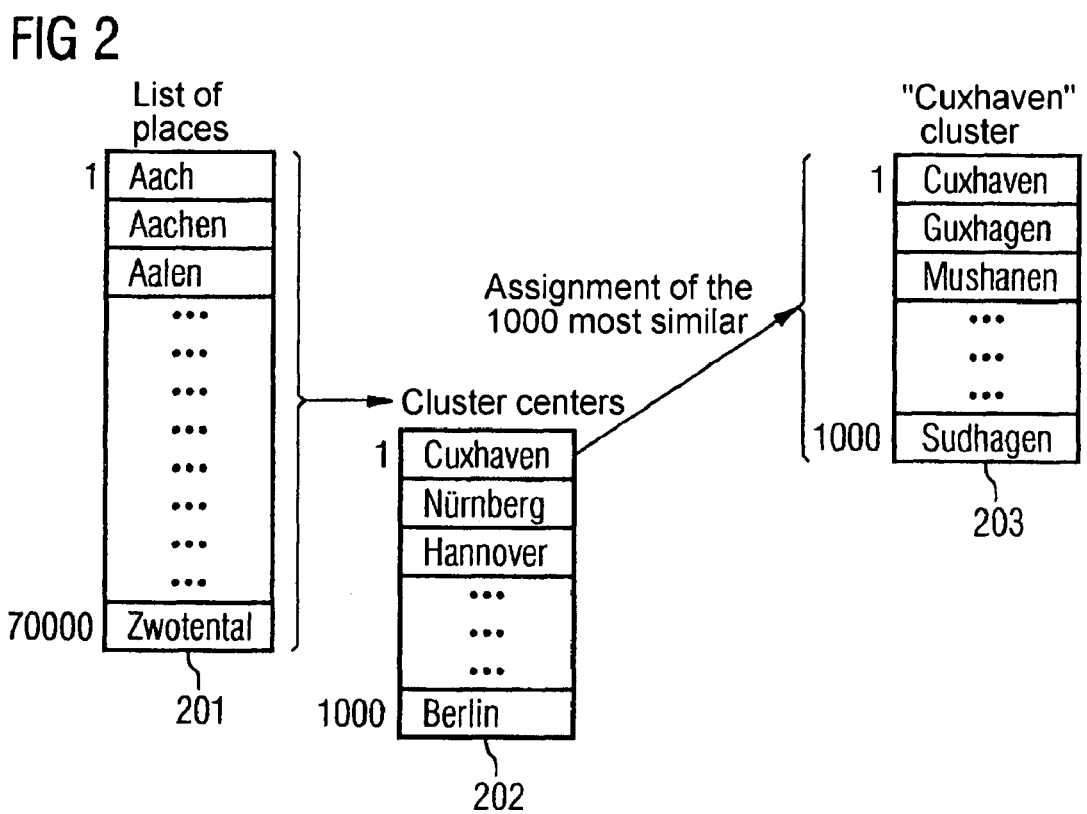
FIG. 2 is a schematic representation of a subdivision of a vocabulary into sections of associated cluster centers.

FIG. 2 shows by way of example a section from a list of place names 201, as might be stored on a navigation-data DVD. In step 202, 1,000 cluster centers are identified by a clustering method from the list of place names. In step 203, 1,000 place names from the list of place names 201 are in turn assigned to each of the cluster centers. In this way, the list of place names has been subdivided into 1,000 sections having respectively 1,000 place-name entries, which list of place names can be stored in a storage structure according to FIG. 1 on a storage medium.

In a first exemplary embodiment, a method is described for inputting town names in a navigation system. To this end, a list of place names is firstly subdivided in a data-driven manner into sections. A vector quantization method is used for this purpose, which vector quantization method assigns all the place names from the list of place names to a limited number of codebook vectors (in this case the centroid of the assigned place names). For this, a distance measure is needed which represents a measure of the phonetic similarity of two place names. Such a distance measure can, for example, be determined in the manner outlined below. In order to find a distance measure for the phonetic similarity of "Munich" and "Bremen", firstly the ranking values of these two cities are determined for a plurality of test utterances such as, for example "Münster" "Bonn" and "Darmstadt". Then the absolute amounts of the differences of the ranking values of the two city names "Munich" and "Bremen" are averaged over all the test utterances. This distance measure can now, using a vector quantization method, be used for subdividing the list of place names into sections of phonetically similar place names.

If, for example, the number of cluster centers is now fixed at 1,000, a subdivision of the list of place names into 1,000 sections is obtained. Once the cluster centers have been determined, 1,000 place names are in turn assigned to each cluster center. These overlapping sections are each stored as a block on the DVD. Recognition of a spoken input is now performed internally in two stages. In the first stage, the voice recognition system assigns the spoken input to the particular section whose cluster center is most similar to the spoken input. In the second stage, the place names of the assigned section on the DVD can be loaded quickly as they are already filed as a block on the DVD. From this list of place names, the voice recognition system recognizes the desired destination location.

In a second exemplary embodiment, the desired destination location is made known to the navigation system by spelling out of the initial letters. A distance value is determined for the distance of two letters so that a distance measure is produced which is dependent on the length of the spoken letter sequence. If, for example, the letters "A U" are recognized, then the places "Au", "Aue", "Augsburg" or "Aurich", among others, can be assigned to a section. If on the other hand the letters "A U E" are recognized by the voice recognition system, then the places Aue, Augsburg or Aurich are assigned to the section. Depending on the distance determined for the letters "G" and "R", Augsburg or Aurich is given a higher ranking value. A different subdivision of the list of place names into sections is thus produced for different lengths of letter sequences. In this example, a subdivision of the list of place names into sections of phonetically similar words is performed for the letter sequence lengths of 3, 5 and 7 letters and the sections determined for the three letter sequences lengths are then in turn stored in blocks on the navigation-data DVD.

In the speech recognition process, it is firstly decided how many letters were spoken and from this the most similar cluster center is determined from the sections for this letter sequence length. The desired destination location is then determined from the list of place names of the assigned section.

A description has been provided with particular reference to exemplary embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for recognizing a spoken input using a predefinable vocabulary, comprising:
   organizing the predefinable vocabulary, prior to receiving the spoken input, based on distance measures of phonetic similarity between pairs of words in the predefinable vocabulary by
      obtaining ranking values of each pair of words in the predefinable vocabulary as possible matches for test utterances independent of the pair of words,
      averaging, for each pair of words in the predefinable vocabulary, differences between the ranking values for all of the test utterances, to obtain the distance measures;
   storing, on a storage medium, the predefinable vocabulary subdivided into sections of phonetically similar words based on the distance measures and using a vector quantization algorithm; and
   characterizing each of the sections of the phonetically similar words by a representative entry;
   assigning the spoken input to one of the sections for which the representative entry is most similar to the spoken input; and
   identifying a closest match for the spoken input among the phonetically similar words in the one of the sections that has been assigned to the spoken input.

2. The method as claimed in claim 1, wherein the spoken input is at least one spoken word.

3. The method as claimed in claim 1, wherein, said determining of the distance measure for phonetic similarity between the pairs of words comprises:
   determining distance values for a similarity of two letter sequences; and
   adding the distance values for the distance measure of the two letter sequences.

4. The method as claimed in claim 3, wherein said storing stores the sections of the predefinable vocabulary by different lengths of letter sequences.

5. The method as claimed in claim 4, wherein a Levenshtein distance is used as the distance measure.

6. A computer readable medium encoding a computer program which when executed by a processor causes the processor to perform a method comprising:
   organizing the predefinable vocabulary, prior to receiving the spoken input, based on a distance measure for phonetic similarity between pairs of words in the predefinable vocabulary by
      obtaining ranking values of each pair of words in the predefinable vocabulary as possible matches for test utterances independent of the pair of words, and
      averaging, for each pair of words in the predefinable vocabulary, differences between the ranking values of the pairs of words for the test utterances to obtain the distance measures;
   storing, on a storage medium, the predefinable vocabulary subdivided into sections of phonetically similar words based on the distance measures and using a vector quantization algorithm; and
   characterizing each of the sections of the phonetically similar words by a representative entry;
assigning the spoken input to one of the sections for which the representative entry is most similar to the spoken input; and
identifying a closest match for the spoken input among the phonetically similar words in the one of the sections that has been assigned to the spoken input.

\* \* \* \* \*